June 2, 1942.  T. R. HARRISON ET AL  2,284,818
GAS ANALYSIS APPARATUS
Filed April 22, 1938   2 Sheets-Sheet 1
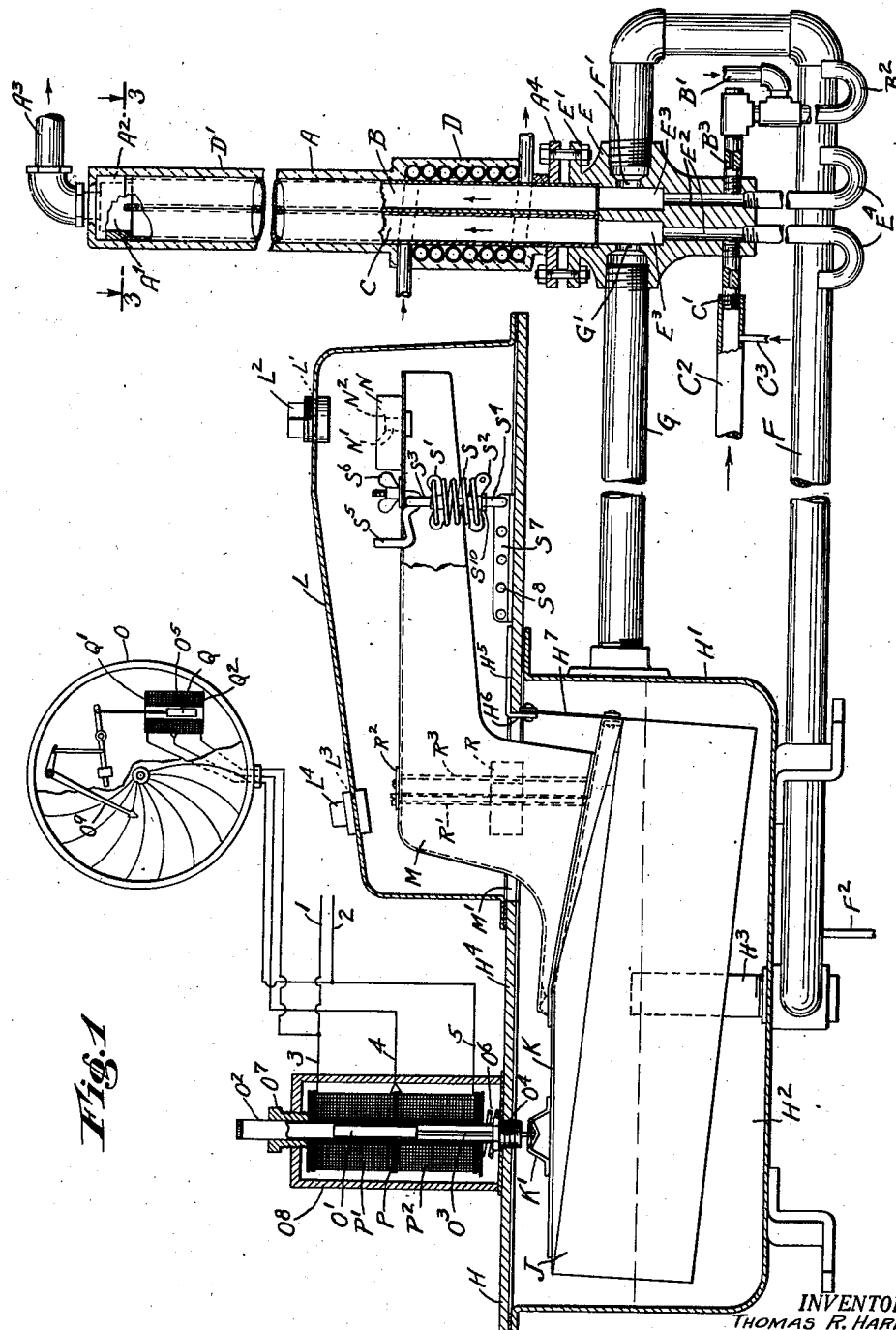
INVENTORS
THOMAS R. HARRISON
ROSCOE D. BEAN
BY
ATTORNEY June 2, 1942.  T. R. HARRISON ET AL  2,284,818
GAS ANALYSIS APPARATUS
Filed April 22, 1938  2 Sheets-Sheet 2
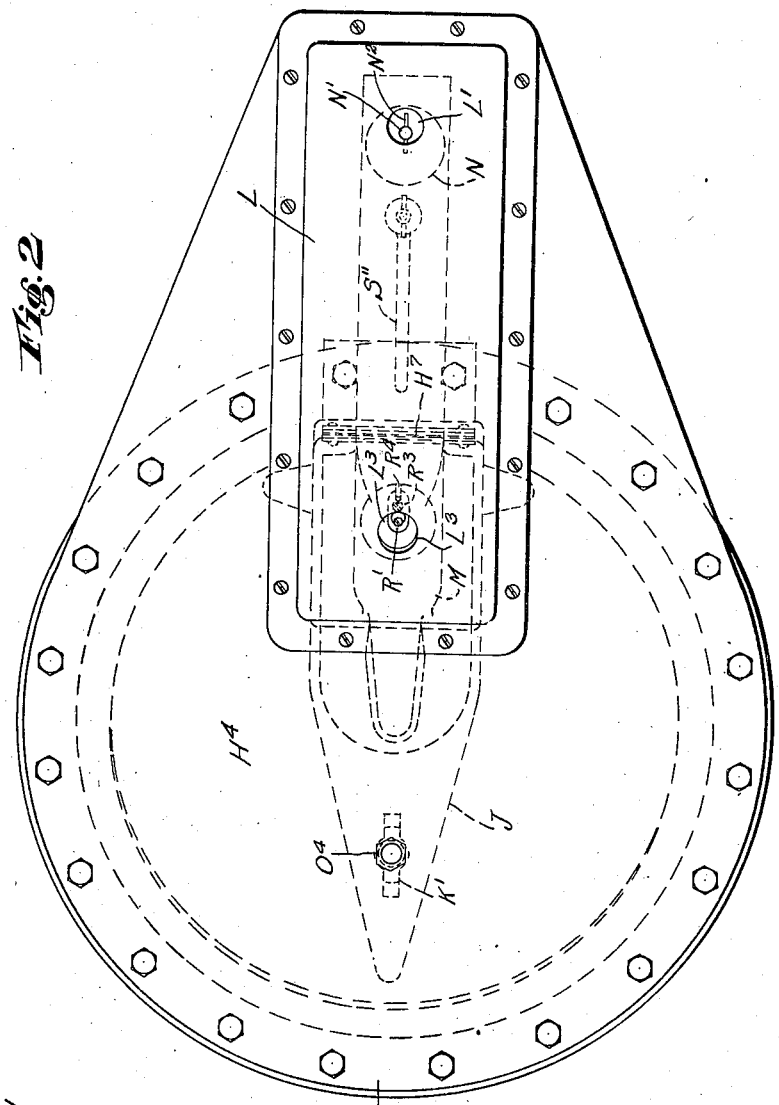
INVENTORS
THOMAS R. HARRISON
ROSCOE D. BEAN
BY
ATTORNEY Patented June 2, 1942

2,284,818

UNITED STATES PATENT OFFICE 2,284,818

GAS ANALYSIS APPARATUS

Thomas R. Harrison, Wyncote, and Roscoe D. Bean, Ambler, Pa., assignors to The Brown Instrument Company, Philadelphia, Pa., a corporation of Pennsylvania Application April 22, 1938, Serial No. 203,534

4 Claims. (Cl. 73—51)

Our present invention comprises improvements in methods and apparatus especially devised for determining the composition of a gas by comparing its density with the density of a gas of known or standard composition, and with the general object in view of providing apparatus for such use characterized by its mechanical simplicity, ruggedness and durability, and by its operative reliability.

More specific objects of the invention are to provide novel and effective methods of and means for eliminating objectionable differences between the temperatures and humidities of the gases, the densities of which are compared, and for preventing variations in gas velocity through the apparatus from producing objectionable errors in the measurements obtained. A further specific object of the invention is to provide improved means for measuring small differentials such as are created by the difference in densities of columns of the gases whose densities are compared and our improved differential measuring apparatus comprises novel means for adjusting the balance, sensitivity and operating range of the apparatus. Another specific object of the invention is to provide improved means for avoiding corrosion of the differential pressure mechanism when either of the gases compared is of a corrosive character.

Our invention was especially devised and is especially adapted for use in the continuous determination of the percentage of carbon dioxide in flue gases, and is especially adapted for such use because of its mechanical simplicity and ruggedness and its operative reliability under the relatively severe operating conditions to which such apparatus may be subjected. It will be apparent to those skilled in the art, however, that the invention is not limited to such use, and that certain features of the invention may advantageously be employed for very different purposes.

The various features of novelty which characterize our invention are pointed out with particularity in the claims annexed to and forming a part of this specification. For a better understanding of the invention, however, and the advantages possessed by it reference should be had to the accompanying drawings and descriptive matter in which we have illustrated and described a preferred embodiment of the invention for use in a flue gas analysis system.

Of the drawings:

Fig. 1 is a somewhat diagrammatic elevation of the apparatus of our invention with certain parts broken away and in section;

Fig. 2 is a plan view of the pressure differential device shown in Fig. 1; and

Fig. 3 is a section on the line 3—3 of Fig. 1.

In the flue gas analysis system illustrated by way of example in Fig. 1, A represents a gas density comparison device comprising a standpipe B normally filled with the test or flue gas, the composition of which is to be determined, and a second standpipe C normally filled with a "standard" gas, i. e. a gas of known composition. The standpipe B is arranged to receive the test gas through a pipe B' which may be connected to a furnace waste gas outlet (not shown) or other source of the test gas which is delivered through the pipe B' to the lower end of the standpipe B. The "standard" gas, preferably atmospheric air, is delivered to the lower end of the standpipe C through a pipe C'. The standpipes B and C open at their upper ends into a small chamber A' formed by a cap $A^2$ having a fluid-tight connection with the standpipes. The cap $A^2$ opens to a conduit $A^3$ leading to a suitable gas exhausting device, such as a suction fan (not shown). With this arrangement of the standpipes and connections, the gas pressures at the upper ends of the standpipes are equalized and a continuous upward flow of the flue and standard gases is maintained.

Substantially the same conditions of gas temperature and humidity are maintained in the standpipes by forming each standpipe of metallic tubing semi-circular in cross-section, and by arranging the standpipes with their plane surfaces in intimate contact with one another throughout the height of the column A, and by subjecting said pipes to a cooling effect. Said cooling effect is produced by a cooling coil D wrapped around the combined standpipes adjacent the base thereof and connected to suitable means (not shown) for continuously passing a cooling fluid, such as water, through the coil D in the direction indicated by the arrows in Fig. 1. A sheathing D' of insulating material is shown as surrounding the combined standpipes and cooling coil D, to intensify the cooling action. The cap $A^2$ is provided with a depending inner circumferential flange $A^4$ welded or brazed into the upper ends of the standpipes, whereby a fluid tight connection between the parts is effected with an external cap diameter not greater than that of the combined standpipes. This arrangement permits the coil D being slipped into position over the cap $A^2$ after the column parts are assembled.

The external standpipe connections B' and C' open into a cast metal base member E formed with a plurality of gas passages. The lower ends of the standpipes fit into a recess in the upper end of the base member and are held in position therein by the engagement of an annular flange E' on the base member with a similar flange $A^4$ mounted on the standpipes. The flue gas sampling connection B' advantageously extends vertically downward before its connection to the base member, to permit any condensate carried by the gas to drop out into a U-tube drain $B^2$ at the lower end of the sampling connection. The sampling connection B' is connected to a constricted vertical passage $E^2$ in the base member by a horizontal pipe $B^3$. The gas passage through the pipe $B^3$ and also through the pipe C', which opens into a similar but separated passage $E^2$, is quite small and serves as a throttling orifice. Each of the constricted passages $E^2$ opens into a corresponding enlarged passage $E^3$, connected at its upper end with the bottom of one of othe standpipes. U-tube drains $E^4$ are connected to the lower ends of the passages $E^2$ below the points of connection of the pipes $B^3$ and C'. The gas pressures in the column at a predetermined level are transmitted by conduits F and G to a suitably sensitive differential pressure device, such as the manometer H. As shown, the conduits F and G open to the respective passages $E^3$ through openings F' and G', respectively.

In operation, the sampling connection B' is usually provided with a porous alundum filter (not shown) positioned in the end of the sampling connection located in the flue gas outlet and serving to separate out liquid and solid particles carried by the flue gas. This filtering process is usually necessary as otherwise the orifice passage in the pipe $B^3$ would rapidly become clogged with deposits and rendered ineffective. The filter, however, offers a resistance to the free flow of the flue gas which varies as the porosity of the filter changes in use. Any change in the filter flow resistance, or in furnace draft suction, tends to change the gas velocity in the standpipe B, particularly as the gas exhausting device connected to the conduit $A^3$ is ordinarily a constant vacuum device. Variations in gas velocity in the column B result in variations in the pressure drop due to friction in the standpipe B. With a constant suction pressure in the equalizing chamber A', the pressure in the gas column at the level of the manometer connection F' will increase with an increase in gas velocity, resulting in "high" readings of the manometer.

In accordance with the present invention we avoid errors due to the effects on friction drop in the standpipes created by changes in gas obtain a compensating change in the velocity velocities, by proportioning the apparatus to obtain a compensating change in the velocity head of the gases at the level at which the manometer is connected to the standpipes. In the form of our invention shown in the drawings, compensation is secured by making the passage $E^2$ sufficiently smaller in diameter than the passage $E^3$ and arranging the manometer connection at such a distance above the bottom of the passage $E^3$, that on an increase in gas velocity, the increased velocity head of the gas jet discharged from the passage $E^2$ into the larger passage $E^3$ results in a correspondingly reduced static pressure in the passage $E^3$ at the level of the manometer connection, which compensates for the increase in friction head resulting in the standpipe B.

By way of example, and not of limitation, we note that in one embodiment of our invention, the passages $E^2$ and $E^3$, are $\frac{1}{4}''$ and $1\frac{1}{16}''$ in diameter, respectively, the distance from the pipe channel $B^3$ to the bottom of the passage $E^3$ is $2''$, the height of the passage $E^3$, is $2''$, the height of the passage $E^3$, is $2\frac{1}{4}''$, and the opening F', is $\frac{3}{16}''$ in diameter, and is $1''$ above the bottom of the passage $E^3$. The air or "standard" gas channels are preferably similarly proportioned and arranged to compensate for changes in velocity of the air entering through the pipe C'.

As shown, the manometer H comprises a container H' partly filled with a sealing liquid $H^2$, such as kerosene or oil, into which the lower end of a horizontally inclined cylindrical bell or diaphragm member J dips and is sealed. The flue gas conduit F is connected through the bottom of the container to a pipe $H^3$, which opens into the interior of the bell J above the normal liquid level therein, and the standard gas conduit G opens through one side of the container to the gas space surrounding the bell. The bell J is provided with a superstructure comprising a tapered plate K having its major portion spaced from the bell top surface and its ends connected to diametrically opposite points on the bell. A cover plate $H^4$ is mounted on and secured to the flanged upper edges of the container H' with a portion projecting beyond one side thereof. A plate $H^5$ secured to the edge of a cut out portion of the cover plate $H^4$, forming an opening M', has a vertical portion $H^6$ extending into the container H' adjacent one side thereof. A metallic strip $H^7$ of suitable flexibility and strength, preferably spring steel, extends between the plate $H^5$ and the end of the plate K immediately below, whereby the bell J is supported from the container H'. The slight flotation effect of the sealing liquid on the bell member is almost negligible, the bell being supported from the container and moving in response to changes in the gas pressure differential impressed thereon.

Additional air conditioning means may be advantageously used in some cases. In particular, the air inlet pipe C' may have an enlarged extension $C^2$ into which steam may be bled through a restricted connection $C^3$ in the small amount required to insure that the air in the column C is saturated.

A sheet metal arm M having an inverted U-shape cross-section is connected to the plate K between the vertical center line of the bell J and its support and extends through the opening M' in the cover plate and laterally above the cover plate extension. The opening M' and the overhanging portion of the arm are enclosed by a casing member L having a fluid-tight contact with the cover plate. The arm is formed with a flat upper surface at one end of which a weight N is eccentrically mounted on a threaded pin N'. The position of the weight on the arm is regulable by inserting a tool through an opening L' in the casing, normally closed by the plug $L^2$, to engage a slot $N^2$ in the weight and thereby adjust the mechanical balance of the bell for a predetermined zero position of the transmitting element armature hereinafter described.

The movements of the pressure differential device are transmitted to a suitable exhibiting mechanism, such as a recording instrument O, through a transmission system comprising a magnetic body or armature O' which is axially movable in and guided by a vertically positioned pressure type tube $O^2$ of non-magnetic material. The lower end of the armature O' is connected by a stem $O^3$ to a bridge member K' mounted on the plate K at the opposite side of the vertical center line of the bell J from the supporting member $H^2$. The lower end of the tube $O^2$ opens into a tubular plug $O^4$ positioned in an opening in the cover plate $H^4$ above the bridge member K'. The exhibiting mechanism comprises an axially movable magnetic body or armature $O^5$ which is moved in accordance with the movements of the armature O' by electro-magnetic transmitting means. The electro-magnetic transmitting means comprise an impedance bridge system which includes a transmitter coil P divided into two superposed end to end coil sections P' and $P^2$ surrounding the tube $O^2$. The coil sections are resiliently supported on the tube $O^2$ by a coil spring $O^6$ surrounding the lower end of the tube. The position of the armature coil sections on the tubes may be adjusted by suitable means, such as an external threaded sleeve $O^7$, contacting with the upper end of the coil sections and in threaded engagement with a cover $O^8$ surrounding the coil sections.

The impedance bridge also includes a receiver coil Q which is similarly divided into a pair of superposed end to end coil sections Q' and $Q^2$ surrounding the axially movable receiver armature $O^5$. Each pair of coil sections are connected in series between alternating current supply conductors 1 and 2 and the coil sections P' and $P^2$ are connected in parallel with the coil sections $Q^2$ and Q' respectively by conductors 3, 4 and 5, the sections of each coil being energized in the same direction. The receiver armature $O^5$ is connected through suitable mechanism to a chart pen $O^9$, which records the movements of the armature on a meter chart.

While the plug $O^4$ through which the transmitting armature is connected to the bell, is positioned in the manometer cover plate as shown, it may also be located in the opening L' and the armature O' connected to the overhanging portion of the arm M, or, if a smaller travel of the armature O' is desirable, the plug $O^4$ may be positioned in an opening $L^3$ at the same side of the bell support member as its illustrated location, but closer to the bell supporting axis. The opening $L^3$ is normally closed by a plug $L^4$. In operation, any difference in density between the flue gas in the standpipe B and the standard gas in the standpipe C between the common upper and the lower levels of the column, as fixed by the points of connection of the conduits F and G, results in a difference between the pressure transmitted through the conduits F and G to the manometer H, which difference is a measure of the difference in specific gravities of the gases. In the embodiment of the invention described, the height of the combined standpipes may well be approximately twelve feet. In such case, with furnace flue gas as the test gas, and air as the standard gas, the pressure differential thus created is approximately equal to .02" of water when the $CO_2$ content of the flue gas is 20%, and to about .012" of water when the $CO_2$ content is 12%. A manometer and exhibiting means of the types shown, may readily be made sufficiently sensitive to accurately exhibit the variations in differential pressure which result from changes in the $CO_2$ content normally occurring. Additional provisions may be made for regulating the sensitivity of the manometer for different uses and different conditions of operations, as is hereinafter described.

When the invention is utilized in determining the $CO_2$ content of furnace gases it is obviously desirable to have a continuous measurement of the gases for effective combustion regulation. For this purpose, the suction in the conduit $A^3$ is sufficient to effect an upward flow of the flue gas and air sufficient to prevent diffusion of the gases and undesirable eddy currents in the standpipes and yet insufficient to create a pressure differential in the standpipes, due to the flow of gas therethrough, which is appreciable compared with the pressure differential impressed on the manometer. The upper surface of the bell J and the points of connection of the pipes F and G to the density column are preferably at substantially the same level. With this arrangement the pressure differential acting on the bell is equal to the difference in weight between columns of air and flue gas of a height equal to the vertical difference between the height of the chamber A' and the level of the openings F' and G', and of a horizontal cross-section equal to the effective cross sectional area of the bell J. In the present instance with the flue gas connection to the underside of the bell and the air connection to the upper side of the bell, an increase in the pressure differential causes the armature O' to rise, which movement is transmitted through the transmitting system to the armature $O^5$ and recording pen $O^9$.

With the arrangement described, it would be necessary to construct the metallic portions of the manometer, exposed to contact with the flue gas, of non-corrodible material because of the corrosive action of certain constituents of the flue gas. Such a construction adds to the initial and operating costs of the manometer. By our present invention such a construction is rendered unnecessary as the conduit F is provided with a small air inlet $F^2$ adjacent its point of connection to the manometer and through which atmospheric air enters in quantities sufficient to fill the portion of the conduit F adjacent the manometer with air, but the portion entering the standpipe B is insufficient to practically affect the density of the gas in the standpipe B. The conduits F and G are arranged with an extended horizontal section to minimize the pulsation effect of the bell movements. The horizontal section of the conduit F is particularly important in preventing diffusion of the flue gases and air in the portion of the conduit adjacent the manometer. In the construction illustrated, it is noted that the conduits F and G are approximately one inch in diameter and the horizontal portion of the conduit F is approximately fourteen feet in length.

While the differential pressure device H is inherently quite sensitive due to its construction and arrangement of the parts, provisions are made for adjusting the sensitivity of the device for different operating conditions. The provisions for this purpose comprise a weight R mounted on a threaded rod R', which has its upper and lower ends rotatably mounted in the arm M and plate K, respectively. The position of the weight R on the rod can be vertically adjusted by rotating the rod with a suitable tool inserted through the plug opening L³. Rotation of the weight with the rod R is prevented by a fixed rod R³ depending from a plate R² positioned on the arm M, the rod R³ passing through a radial slot R⁴ in the weight. Changing the position of the weight from a neutral position (substantially that shown) relative to the supporting axis of the bell increases the moment of inertia of the moving parts of the manometer with a corresponding decrease in the sensitivity of the device.

While the apparatus of our invention has been particularly described in connection with a flue gas analysis system, it is useful in comparing the densities of other gases. In such installations, the varying pressure differentials impressed on the bell J may be widely different than in a flue gas analysis system. In such cases the manometer would probably be replaced by a manometer designed for the proper operating range, unless provisions are made to adapt the manometer for different ratings. In the present construction provisions are made for adjusting the manometer for use with various ranges of operation down to a minimum differential pressure of .02 inch of water for a full scale reading. Such provisions comprise a coiled spring S with its end threaded into spring guide members S' and S², the guide S' being fixed on the lower end of a rod S³ and the guide S² being adjustable on the upper end of a threaded rod S⁴ in axial alignment with the end of the rod S³ and maintained in the adjusted position by a lock nut S¹⁰. The upper end of the rod S³ hooks over a supporting rod S⁵, which is adjustably positioned on the arm M by a wing nut S⁶. The lower end of the rod S⁴ is curved and positioned in one of a series of longitudinally spaced holes S⁸ in a plate S⁷ fixed on the cover plate extension H⁴. The compression of the spring S can be adjusted by changing the vertical position of the guide member S² on the rod S⁴ with a corresponding change in the force opposing movement of the bell J. The manometer is adjusted for successively lower operating ranges by shifting the rod S⁴ to holes in the plate S⁷ nearer the bell supporting axis and making a corresponding adjustment in the position of the rod S⁵ in a longitudinally extending slot S¹¹ in the top surface of the arm M. The holes S⁸ are spaced apart predetermined distances corresponding to a sequence of operating ranges.

While in accordance with the provisions of the statutes, we have illustrated and described a preferred embodiment of our invention it will be apparent to those skilled in the art that changes may be made in the form of the apparatus and in the method disclosed without departing from the spirit of our invention as set forth in the appended claims and that in some cases certain features of our invention may be used to advantage without a corresponding use of other features. For example, our invention in its broader aspects does not require the use of any particular kind of differential pressure device, and may be carried out with apparatus differing from that illustrated. The manometer illustrated may be advantageously used for other purposes, particularly in flow metering systems.

Having now described our invention what we claim as new and desire to secure by Letters Patent, is:

1. Apparatus comprising two vertical standpipes, means for passing a gas of known density through one and a gas of unknown density through the other of said pipes, said pipes being connected at one level, a differential pressure device, conduits connecting said device and pipes at a predetermined level lower than the level at which said pipes are connected, and means for compensating said apparatus for variations in gas velocity in said pipes including a passage in each of said pipes of smaller cross sectional area than the cross sectional area of said pipes, said passages being arranged at such a distance below the level at which the said conduits are connected that on a change in gas velocity through the pipes the changed velocity head of the gas discharge from the said passages into the pipes results in a correspondingly changed static pressure in the pipes at the level of the conduit connections which compensates for the increase in friction head resulting in the pipes.

2. Apparatus of the character described, comprising a first standpipe and a second standpipe, a source of gas of known composition, a source of gas of unknown composition, suction means for drawing gas from said first mentioned source up said first mentioned standpipe and gas from said second mentioned source up said second mentioned standpipe, an atmosphere containing gas of composition different from that obtained from said second mentioned source, a differential pressure device for measuring the relative pressures in said standpipes at a predetermined level, said differential pressure device being subject to deterioration from corrosive substances which may be present in said gas of unknown composition, and conduits connecting said standpipes and differential pressure device at said level, the conduit connected to said second mentioned standpipe having an opening at the end thereof adjacent said differential pressure device to said atmosphere through which gas from said atmosphere is drawn by said suction means through said conduit to said last mentioned standpipe whereby said gas of unknown composition is prevented from flowing through the conduit associated with said second mentioned standpipe to said differential pressure device.

3. Apparatus of the character described, comprising a first standpipe and a second standpipe, a source of gas of known composition, a source of gas of unknown composition, suction means for drawing gas from said first mentioned source up said first mentioned standpipe and gas from said second mentioned source up said second mentioned standpipe, a differential pressure device for measuring the relative pressures in said pipes at a predetermined level, said differential pressure device being subject to deterioration from corrosive substances which may be present in said gas of unknown composition, and conduits connecting said standpipes and differential pressure device at said level, the conduit connected to said second mentioned standpipe having an opening at the end thereof adjacent said differential pressure device through which gas from said first mentioned source is drawn by said suction means through said conduit to said last mentioned standpipe whereby said gas of unknown composition is prevented from flowing through the conduit associated with said second mentioned standpipe to said differential pressure device.

4. Apparatus of the character described, comprising a first standpipe and a second standpipe, a source of gas of known composition, a source of gas of unknown composition, suction means for drawing gas from said first mentioned source up said first mentioned standpipe and gas from said second mentioned source up said second mentioned standpipe, a differential pressure device for measuring the relative pressures in said pipes at a predetermined level, said differential pressure device being subject to deterioration from corrosive substances which may be present in said gas of unknown composition, and conduits connecting said standpipes and differential pressure device at said level, the conduit connected to said second mentioned standpipe having a horizontally elongated portion adjacent said differential pressure device with an opening to the atmosphere therein through which air is drawn by said suction means through said conduit to said last mentioned standpipe whereby said gas of unknown composition is prevented from flowing through the conduit associated with said second mentioned standpipe to said differential pressure device.

THOMAS R. HARRISON.
ROSCOE D. BEAN.

CERTIFICATE OF CORRECTION.

Patent No. 2,284,818. June 2, 1942.

THOMAS R. HARRISON, ET AL.

It is hereby certified that error appears in the printed specification of the above numbered patent requiring correction as follows: Page 2, first column, line 61, strike out the words "obtain a compensating change in the velocity"; and second column, line 9, strike out "the height of the passage $E^3$, is 2'',"; page 3, first column, line 11, for "member $H^2$" read --member $H^7$--; and that the said Letters Patent should be read with this correction therein that the same may conform to the record of the case in the Patent Office.

Signed and sealed this 4th day of August, A. D. 1942.

Henry Van Arsdale,
Acting Commissioner of Patents.

(Seal)